United States Patent [19]

Dir

[11] Patent Number: 4,527,864
[45] Date of Patent: * Jul. 9, 1985

[54] HIGH CONTRAST LIQUID CRYSTAL DISPLAY DEVICES

[75] Inventor: Gary A. Dir, Fairport, N.Y.

[73] Assignee: Xerox Corporation, Stamford, Conn.

[*] Notice: The portion of the term of this patent subsequent to Mar. 26, 2002 has been disclaimed.

[21] Appl. No.: 480,161

[22] Filed: Mar. 29, 1983

[51] Int. Cl.³ .............................................. G02F 1/133
[52] U.S. Cl. ..................................... 350/337; 350/349
[58] Field of Search ..................... 350/337, 349, 350 R

[56] References Cited

U.S. PATENT DOCUMENTS

| 3,597,044 | 8/1971 | Castellano | 350/349 |
|---|---|---|---|
| 3,963,312 | 6/1976 | Wild | 350/337 |
| 4,211,473 | 7/1980 | Shanks | 350/337 |
| 4,288,147 | 9/1981 | Koch | 350/349 |
| 4,391,730 | 7/1983 | Kuschel et al. | 350/350 R |

FOREIGN PATENT DOCUMENTS 13429 1/1982 Japan ................................... 350/337

OTHER PUBLICATIONS

Voltage-Dependent Optical Activity of a Twisted Nematic Liquid Crystal by M. Schadt and W. Helfrich from Applied Physics Letters, Feb. 15, 1971, vol. 18, No. 4, pp. 127-128.
Optimum Polarizer Combination for Twisted Nematic Displays by T. J. Scheffer and J. Nehring from IEEE Transactions on Electronic Devices, Jul. 1977, vol. ED-24, No. 7, pp. 816-822.
Optical Characteristics of Twisted Nematic Liquid Crystal Films by C. H. Gooch and H. A. Tarry from Electronics Letters, Jan. 10, 1974, vol. 10, No. 1, pp. 2-4.
Guest-Host Interactions in Nematic Liquid Crystals, A New Electro-Optic Effect by G. H. Heilmeier and L. A. Zanoni from Applied Physics Letters, Aug. 1, 1968, vol. 13, No. 3, pp. 91-92.
New Absorptive Mode Reflective Liquid Crystal Display by D. L. White and G. N. Taylor, from Journal of Applied Physics, Nov. 1974, vol. 45, pp. 4718-4723.
U.S. Application Serial No. 420,963 to John W. Daughton, filed Sep. 21, 1982.

Primary Examiner—John K. Corbin
Assistant Examiner—David Lewis
Attorney, Agent, or Firm—Robert A. Chittum

[57] ABSTRACT

A liquid crystal display device having high extinction ratio polarizers on the input and output sides of a transmissive, twisted nematic liquid crystal cell. The liquid crystal cell incorporating a dichroic dye which is admixed with the liquid crystal material. The high extinction ratio polarizers get the full contrast and density capability from the liquid crystal cell while the dichroic dye prevents the buildup of the contrast limiting orthogonal mode of the polarized light passing therethrough, thus, further increasing the optical contrast and density. Such an arrangement provides optical contrasts of around 150:1 with a 10 micron thick liquid crystal cell.

6 Claims, 9 Drawing Figures

HIGH CONTRAST LIQUID CRYSTAL DISPLAY DEVICES

FIELD OF THE INVENTION

The present invention relates to liquid crystal display devices and more particularly, to those of the transmissive, twisted nematics, guest-host type incorporating dichroic dye.

DESCRIPTION OF THE PRIOR ART

Liquid crystal displays (LCDs), after enjoying enormous success in the area of electronic calculators and watches, moved on to applications in clocks, games, toys, etc. In existing applications, which are predominantly light reflective, the optical contrast is limited due to polarizer selection and the fundamental light propagating properties of the twisted-nematic configuration. For present uses the optical contrast is obviously adequate, but there are a number of new applications that require higher contrast. Presently, efforts are being made to achieve multifunctional displays by enhancing the characteristics of the liquid crystal displays (LCDs).

It is expected that the market for LCDs will expand as well into home electrical appliances, audio equipment, automatic instrument panels, and office automation equipment. For this to happen, one of the characteristics of the LCD that must be improved is its optical contrast between off and on states as has been accomplished by the high contrast device which is the subject of the present invention.

In a typical transmissive type, liquid crystal display device, a thin layer of liquid crystal material is sandwiched between glass substrates bearing transparent, patterned electrodes on their inner confronting surfaces, a polarizer adjacent the external surface of a one of the glass substrates and a light source that confronts the polarizer. By selectively applying an electric field across the layer of liquid crystal material by means of address potentials applied to the electrodes, the transmissivity of the liquid crystal device may be changed for displaying information in accordance with the electrodes addressed.

Liquid crystal materials are organic substances made up of rod-like molecules that are typically about 10 angstroms long and several angstroms thick. Within a certain temperature range, called mesomorphic range, these materials exhibit optical properties of an ordered crystal but have flow properties of liquid. The materials widely used as liquid crystals are of the biphenyl, phenylcyclohexane and cyclohexane families.

There are three general types of liquid crystal materials; viz, the smectic, the nematic and the cholesteric. These are distinguished by differing types of translational or orientational ordering in their molecular arrangement. In the nematic phase, the center of gravity of the molecules is unordered and random, as in the case of isotropic liquids, but the molecules tend to align themselves with their long axes parallel. In the smectic phase, the long axes of the molecules align themselves parallel to each other but the molecules also exist in separate layers. In the cholesteric phase, the molecules align themselves in separate planes with their long axes parallel to each other with each plane. However, the direction of the long axes of the molecules is progressively twisted from plane to plane.

Since the individual liquid crystal molecules have an elongated shape and dipoles (both permanent and induced) which are direction dependent, films of these materials exhibit anisotropy in their dielectric constant and refractive index. The dielectric anisotropy is expressed as $\Delta\epsilon = \epsilon_{\parallel} - \epsilon_{\perp}$, where $\epsilon_{\parallel}$ is the dielectric constant parallel to the director and the $\epsilon_{\perp}$ is the dielectric constant perpendicular to the director. The director is simply the average position of the long molecular axis. Materials that exhibit a positive dielectric anisotropy are referred to as p-type materials, while those with a negative dielectric anisotropy are referred to as n-type. Molecules of p-type liquid crystal materials tend to align themselves parallel to an applied electric field, while molecules of n-type material tend to align perpendicular to the field. Because of their optical anisotropy, a change in orientation of liquid crystal molecules by an electric field can cause a change in optical transmission when used in conjunction with light polarizing sheets.

Of the numerous types of liquid crystal displays that have been explored, the most important at present are those based on the twisted-nematic field effect. The usual reference for disclosure of the conventional twisted-nematic effect is M. Schadt and W. Helfrich, "Voltage Dependent Optical Activity of a Twisted Nematic Liquid Crystal," Applied Physics Letter, Vol. 18, pages 127–128, 1971. By suitable treatment of the glass substrate surfaces, the p-type nematic liquid crystal molecules are caused to align in a particular direction parallel to the glass substrate surfaces. This alignment may be produced by vacuum deposition of a very thin silicon monoxide or magnesium fluoride film onto the surfaces of the glass substrates at a very oblique angle. Alternatively, the glass surfaces may be coated with a thin organic film and then rubbed with a lint-free cotton twill cloth in a unidirectional manner. In the latter case, fine grooves about 50 angstroms wide are formed, causing the liquid crystal molecules to lie parallel to these furrows since this results in a lower energy state. During fabrication, the two glass plates are oriented with their alignment perpendicular to each other. This causes a gradual twist in alignment of the liquid crystal molecules between the two glass plates.

A typical prior art transmissive-type, twisted nematic liquid crystal device 10 is shown in FIG. 1A in the off state and in FIG. 1B in the energized state. A polarizer 11 and an analyzer 12 are attached to the outside surfaces of the glass plates 13, 13a. The polarizing axes of these are made parallel, coinciding with the direction of alignment of the liquid crystal molecules 14 at the top plate 13a. Because of the relatively gradual twist of the liquid crystal molecules, polarized light entering the liquid crystal material gradually twists its direction of polarization as it passes therethrough, emerging with its polarization rotated by $\pi$ degrees. Since this light is blocked by the output analyzer 12, the device appears nearly opaque when viewed from the output side. Generally, the prior art disclosures state that the twisted nematic devices possess wave-guide-like properties. That is, a first polarizer plane polarizes white light which, due to a wave-guide-like action, is rotated by the twist angle of the liquid crystal molecules. While this is approximately true, the statement is not exact. As will be explained later, approximately 2% of the light exists in an orthogonal component which passes through the analyzer resulting in "bleed-through". The present invention prevents this orthogonal light component from exiting the liquid crystal material, as will be fully described later. The elimination of the passage of the orthogonal component of light increases the optical contrast above levels previously thought possible.

Generally, liquid crystal materials used in twisted-nematic devices have a positive dielectric anisotropy, so that, when a voltage is applied, the director of the molecules in the center of the layer tends to orient itself parallel to the applied field, as shown in FIG. 1B. Above some threshold voltage (e.g., 1 to 3 volts) the molecules become oriented with the director parallel to the applied field, except for those bound at the immediate surfaces of the glass. Since, in this condition, the liquid crystal layer no longer twists the direction of polarization of the light, it passes through the analyzer unobstructed. The fact that at intermediate voltages partial light transmission occurs is of importance in devices where grey scale is required. If the applied voltage is cut off, intermolecular forces causes the liquid crystal molecules to return to the twisted configuration of FIG. 1A, blocking most of the light transmission. Essentially, no dc current is required to produce a change in optical state because of the high resistivity ($>10^{10}$ ohm cm) of the liquid crystal materials. The power for switching such a device on, therefore, is low, usually less than 1 $\mu$W/cm$^2$.

To avoid the need for a separate light source, reflective-type twisted-nematic devices are frequently employed that make use of ambient light, thus saving power and enabling compact display devices to be built. This is the type commonly used in watches and calculators. Typically, the reflective-type uses a crossed polarizer/analyzer pair mounted on the outer surfaces of the glass, and a mirror with a diffuser is attached to the rear of the structure. In practice a diffuse reflecting element in the form of an aluminum-painted plate may be used.

Since the incident light must pass twice through the device and twice through each of the polarizers, the intensity of the reflected light reaching the eye is substantially reduced. In such cells a "shadow image" may also be seen at the electrode edges, if the cell is viewed from an angle. This results from the fact that light incident the diffuse reflector is shadowed by the liquid crystal layer. To minimize the separation of the two images, the lower glass plate is made as thin as possible.

To increase the brightness of the device in its reflective state, a diffuse reflector with optical gain may be used, concentrating the reflected light, for example, into a cone of about 45° half-angle. Generally, non-diffuse (specular) reflectors are avoided because of their excessive directional characteristics. The light transmission through the device and its brightness can, of course, also be increased by providing antireflective coatings on the outer glass surface. Also, it is desirable to eliminate air spaces between the polarizers and glass plates to minimize undesired reflections.

In general, there is an inverse relationship between the brightness of a cell in its reflecting state and its contrast ratio (i.e. the ratio of the light between its reflecting and non-reflecting states). It is understood that the best compromise exists between these two factors when the top polarizer transmits 42-45% of the incident light and the bottom polarizer transmits 48-55% of the light. Refer to Scheffer, T. J. and Nehring, J. (1977) "Optimum Polarizer Combinations for Twisted Nematic Displays," IEEE Trans. Electron Devices ED-24 (7), 816-822.

Since the contrast ratio of reflective liquid-crystal displays is independent of the level of ambient light, such displays are immune to "washout" even in direct sunlight. However, for viewing such displays at low light levels or in darkness some form of artificial light is required. Frequently a tiny lamp is included at the edge of the diffuser for this purpose. Alternatively, for use in watches a flat glass cell containing tritium and phosphor as a light source is placed behind the diffusing surface.

It is important to realize that conventional displays are not limited in contrast by fundamental properties of the liquid crystal itself. Rather, contrast is polarizer limited. Manufacturers of these displays, mostly of the reflective type, choose polarizing materials which are optically efficient to achieve the brightest display possible when used in ambient illumination. Film polarizers have the property that those that give the highest extinction ratio also tend to be the most glossy. By extinction ratio it is meant the intensity of the light passed by two parallel polarizers divided by the value for the crossed case. Therefore, high contrast and high brightness are not simultaneously obtained. In fact, a trade-off must be made between contrast and brightness.

Tables 1(a) and 1(b) below illustrates this point. In Table 1(a) a list of polarizers by the Polaroid Corporation and identified by their tradenames, as well as measured extinction ratios, are shown. The Polaroid Corporation conveniently identified their products with a number which is a measure of the white light transmission of a single polarizer to randomly polarized white light. For example, an HN55 transmits 55% of unpolarized white light, etc. The extinction ratio which is simply the ratio of white light transmittance with polarizers crossed and parallel clearly increases with decreasing polarizer white light transmission.

In Table 1(b), the on axis white light photopic contrast ratio of a 10 micron thick LCD cell filled with Merck liquid crystal #1132, a biphenyl mixture, is shown with polarizers which have a wide range of extinction ratios.

TABLE 1(a)

| Polarizer | Extinction Ratio |
|---|---|
| Polaroid HN-55 | 3.59 |
| Polaroid HN-48 | 3.80 |
| Polaroid HN-42 | 143 |
| Polaroid HN-32 | ~8000 |

TABLE 1(b)

| Polarizer | Extinction Ratio | Contrast Ratio |
|---|---|---|
| Polaroid HN-48 | 3.80 | 3.69 |
| Sanritz LC-82-13 | 15.6 | 11.0 |
| Polaroid HN-32 | ~8000 | 46.7 |

Conventional twisted nematics (TN) materials change the state of light polarization. Polarizers are required to transform the light polarization changes to light intensity differences which are detectable by the human eye.

Using HN48's, a contrast in transmission of 3.69 was obtained which is within 3% of the maximum of 3.8. If Sanritz Limited LC-82-13's are used, a contrast ratio of 11.0 is obtained, 30% lower than the maximum of 15.6. If very high extinction ratio polarizers such as Polaroid HN32's are used, the contrast increases substantially, a value of 46.7 is obtained. However, the contrast ratio is now orders of magnitude below the extinction ratio of 8,000 which is possible with polarizers alone. Clearly, the first two cases give results which are polarizer limited while the final one is not. This result indicates that a typical TN cell passes about 2% of white light which is not due to any deficiency in the polarizers themselves, as mentioned above.

Thus, to operate in the regime where contrast and density are not polarizer limited, high extinction ratio polarizers must be used. Further, increases in contrast and density require changes in the liquid crystal cell itself. Such changes, as described below, form the present invention.

One would conclude if complete wave-guide action existed that plane polarized white light would exit the last layer of liquid crystal molecules. In fact, the light leaving the liquid crystal material is weakly elliptically polarized.

A more complete description of this phenomena follows. In addition to the main plane polarized mode which follows the twist of the cell, a second mode of propagation with its electric vector at right angles (orthogonal) to the first mode builds up. This mode is free to be passed by the final polarizer (analyzer). Since about 2% of the light is in this mode, contrast is limited to 50:1. Gooch and Tarry have described in the following reference, a mathematical treatment of the light propagation which includes the orthogonal mode.

C. H. Gooch and H. A. Tarry, "Optical Characteristics of Twisted Nematic Liquid Crystal Films," Electronic Letters, 10 1, 1974.

Using Gooch and Tarrys formulation, a 3-dimensional plot of the light transmission as a function of liquid crystal layer thickness and the wavelength of light is presented in FIG. 2. Note that it can readily be seen from FIG. 2 that liquid crystal layer thicknesses in access of 10 µm greatly reduce the light transmission.

Twisted nematic LCDs are typically operated in the so-called Mauguin limit; that is, the wavelength of light ($\lambda$) is much less than twice the birefringence ($\Delta\eta$) times the liquid crystal layer thickness d:

$$\lambda << 2\Delta\eta d$$

A typical value for $2\Delta\eta d$ ($\Delta\eta = 0.14$, $d = 10$ microns) is about 3. Such a liquid crystal cell would operate in what may be referred to as the near mauguin limit. If the liquid crystal layer thickness and/or birefringence is increased, the optical contrast is increased. If we were to increase the layer thickness so that $2\Delta\eta d$ is much greater than 3, which may be deemed the far mauguin limit, to say a value of 10, the photopic contrast ratio becomes several hundred to one. However, there is a price to pay for this improvement in contrast; viz, the viewing angle and turn-off time are compromised. Since the turn-off time is proportional to the thickness squared, a long turn-off time would be encountered. This increased turn-off time is totally unacceptable for uses such as office automation equipment and automotive instrument panels.

A technique for reducing the orthogonal light component without using thick cells which result in increase turn-off times involves the addition of a dichroic dye to the liquid crystal material. The inclusion of a dichroic dye to prevent the build-up of the orthogonal component pertains to the subject of the present invention. The incorporation of dichroic dyes in liquid crystals was first described in the following reference:

G. H. Heilmeier and L. A. Zanoni, Appl. Phys. Lett. 13, 91, 1968.

Heilmeier coined the term "Guest-Host Effect" which is now widely used. The liquid crystal, present in high concentration is the "host" while the dichroic dye, present in small concentration is the "Guest". The liquid crystal essentially governs the electrical properties while the dye is there for its advantageous optical properties.

Simply stated, when the dichroic dye has its long, absorbing axes coparallel to the electric vector of incident light, maximum absorption takes place. When the absorbing axes and light electric vector are at right angles, minimum absorption takes place. FIG. 3 illustrates two typical states for a "Heilmeier-type" device. Note no molecular twist exists in this configuration. Further note that a single polarizer on one side of the device only is used. The first public disclosure of a dichroic dye in a twisted configuration was made in the following reference:

D. L. White and G. N. Taylor, J. Appl. Phys. 45, 4718, 1974.

In this device, there are a number of turns of the molecular helix allowing incident randomly polarized white light to be absorbed to a degree. This allows the device to be operated with no polarizers.

In liquid crystal materials, thermally induced temporal fluctuations in the molecular axis exist. Thus, the plane of polarization of incident light is not always parallel to the liquid crystal and/or dichroic dye molecular axis. Consequently, contrast ratio is reduced at a given temperature. There exists liquid crystal materials which fluctuate by different amounts. Those with minimal fluctuation have high order parameters and are the most desirable.

The addition of dichroic dyes to liquid crystal material is well known. However, dyes are generally used for features such as broad viewing angles or elimination of one or both polarizers. Since less than about 10 weight percent of dye can be dissolved in state-of-the-art liquid crystal materials (order parameter$\approx 0.75$), the prior art teaches that the contrast ratio of the images that is obtained is limited through the use of a dye in a twisted-nematic guest-host display to a relatively low value of around four or five. The high contrast LCD of the present invention overcomes this limitation.

U.S. Pat. No. 4,288,147 to Koch discloses a host liquid crystal admixed with various guest dichroic dyes. In this patent, the electro-optic composition has a host liquid crystal which may include conventional and well-known materials such as nematic and cholestric liquid crystals, while the guest dichroic dye is characterized as a linear, non-condensed aromatic compound which includes a quinonoid ring as the chromophore or color generating group. In positive dichroic dyes, such as discussed in this patent, light which impinges on the dye molecules (generally having a long, rod-like structure) perpendicular to its long axes is absorbed more strongly than light which impinges on the molecule parallel to its long axes. This patent discloses that the advantageous properties of dyes of this type are attributable to their long structure which results in a high order parameter and thus improved contrast and to the quinonoid ring as the color generating group. These dyes impart color when incident light impinges on the dye molecules perpendicular to their long axes. The liquid crystal solution is colorless when the incident light impinges parallel to the dye long axes.

U.S. Pat. No. 4,211,473 to Shanks discloses a reflective-type liquid crystal display device having front and rear polarizers and a reflector. An enhanced contrast is achieved for this type of device by the use of pleochroic dye in the liquid crystal display material, a rear polarizer, pleochroic and a fluorescent materials are incorporated in balanced proportion and have absorption and emission spectra, respectively, that are complementary. Light incident on the display is converted so that the light reaching the eye from the bright state regions is neutral grey in contrast to the light from the dark state regions which is strongly attenuated and may be strongly colored.

SUMMARY OF THE INVENTION

It is the object of the invention to provide a transmissive-type, liquid crystal display device having a high contrast between energized and off-state conditions.

It is another object of the invention to provide a transmissive-type liquid crystal display device having a very dark off-state (optical density≅3) condition and having substantially no light "bleed through".

It is a further object of this invention to provide a transmissive-type liquid crystal display device that prevents the passage of the orthogonal mode of light in the off-state condition.

It is yet another object of this invention to provide a transmissive-type liquid crystal device having a photopic contrast ratio to white light of around 150:1.

In the present invention, a high extinction ratio polarizer is used on either side of a twisted nematic liquid crystal display device to get the full contrast and density capability of a conventional twisted nematic. Dichroic dye is added to the liquid crystal material to prevent the buildup of the contrast limiting orthogonal mode normally passed by the back polarizer; hence, contrast and density are both increased. Such an arrangement provides photopic contrasts to white light of around 150:1 with a 10 micron liquid crystal cell, a contrast ratio unavailable by prior art techniques.

DESCRIPTION OF THE PREFERRED EMBODIMENT

Figure 1A:
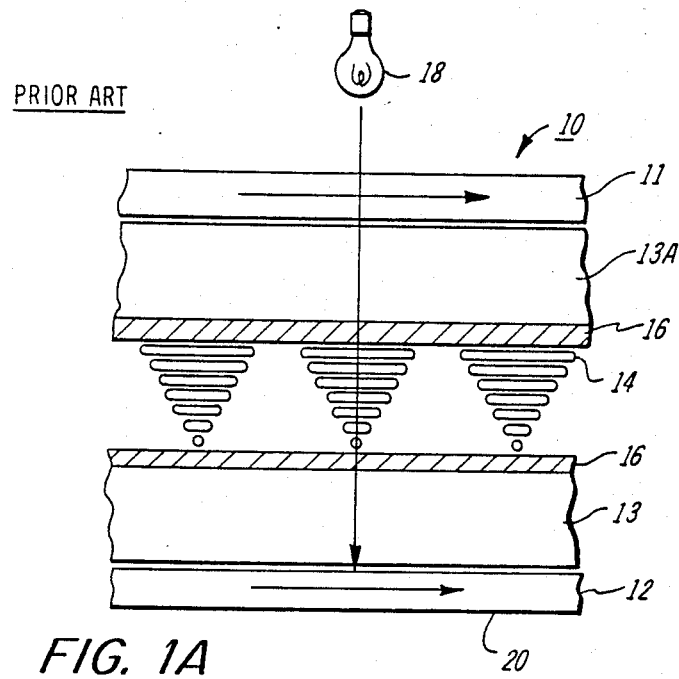
FIG. 1A is a cross-sectional side view of a schematical representation of conventional transmissive-type, twisted nematic liquid crystal device in the off-state condition.
Figure 1B:
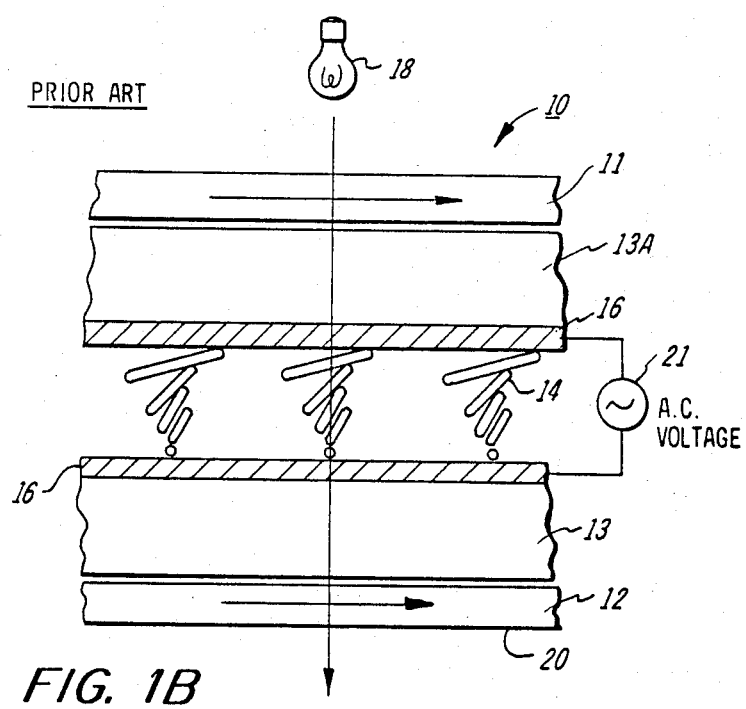
FIG. 1B is a cross-sectional side view of a schematical representation of a conventional transmissive-type, twisted nematic liquid crystal device in the energized or on-state condition.
Figure 2:
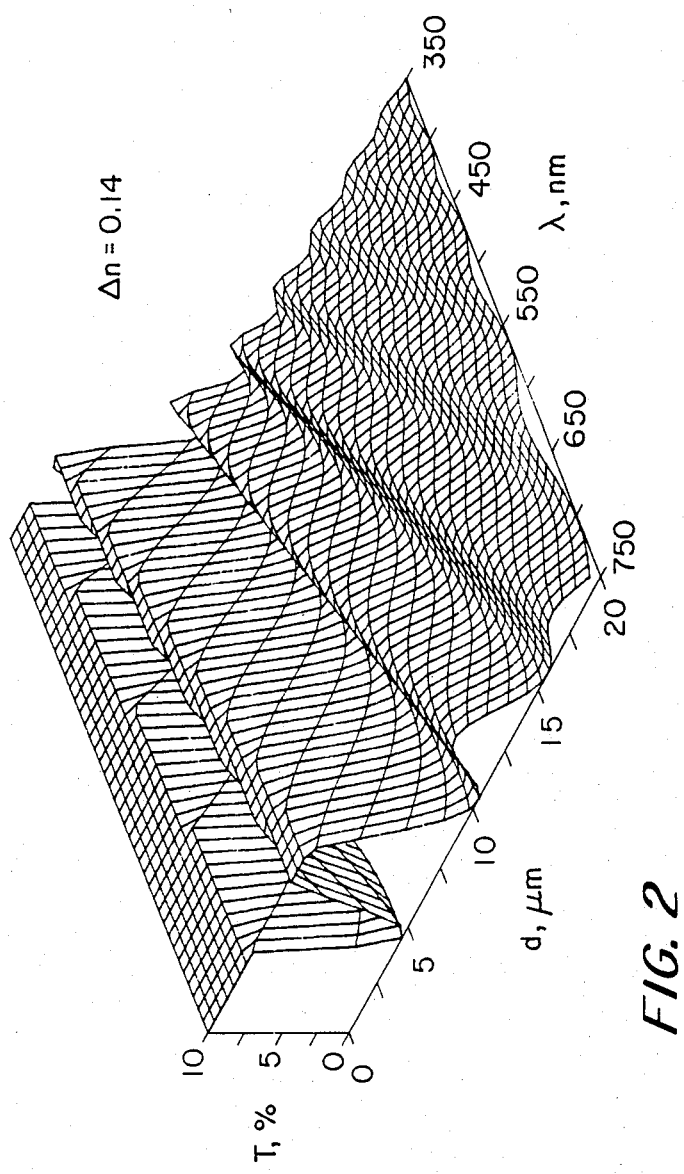
FIG. 2 is a three dimensional plot of the percent of light transmission as a function of liquid crystal material thickness and the wavelength of light.

FIG. 1A and FIG. 1B show a typical prior art transmissive-type, twisted nematic liquid crystal device 10 in the off-state and the on or energized state, respectively. The device comprises parallel, upper transparent glass substrate 13a and lower transparent glass substrate 13, each having transparent electrodes 16 on the inner confronting surfaces of the glass substrates. A thin layer of p-type, twisted nematic liquid crystal material is sandwiched between the transparent electrodes. A polarizer 11 and an analyzer 12 are attached to the outer surfaces of the glass substrates. The polarizing axes of the polarizer and analyzer are made parallel and coinciding with the direction of the alignment of the liquid crystal molecules 14 at the upper glass substrate 13a. The liquid crystal molecules gradually twist so that the molecules at the lower substrate have been rotated 90 degrees and are perpendicular to those adjacent the upper glass substrate. The polarized light from source 18 is substantially blocked when viewed from the output side 20 because of the polarizing direction of analyzer 12.

When the electrodes 16 have an alternatively current (AC) voltage from source 21 that is above a certain threshold applied across them, the liquid crystal molecules become oriented in a direction substantially parallel to the applied electric field, except for those molecules bound at the surfaces of the glass substrates. In this energized condition, the liquid crystal layer no longer twists the direction of polarization of the light and, therefore, it passes through the analyzer 12.

Figure 3:
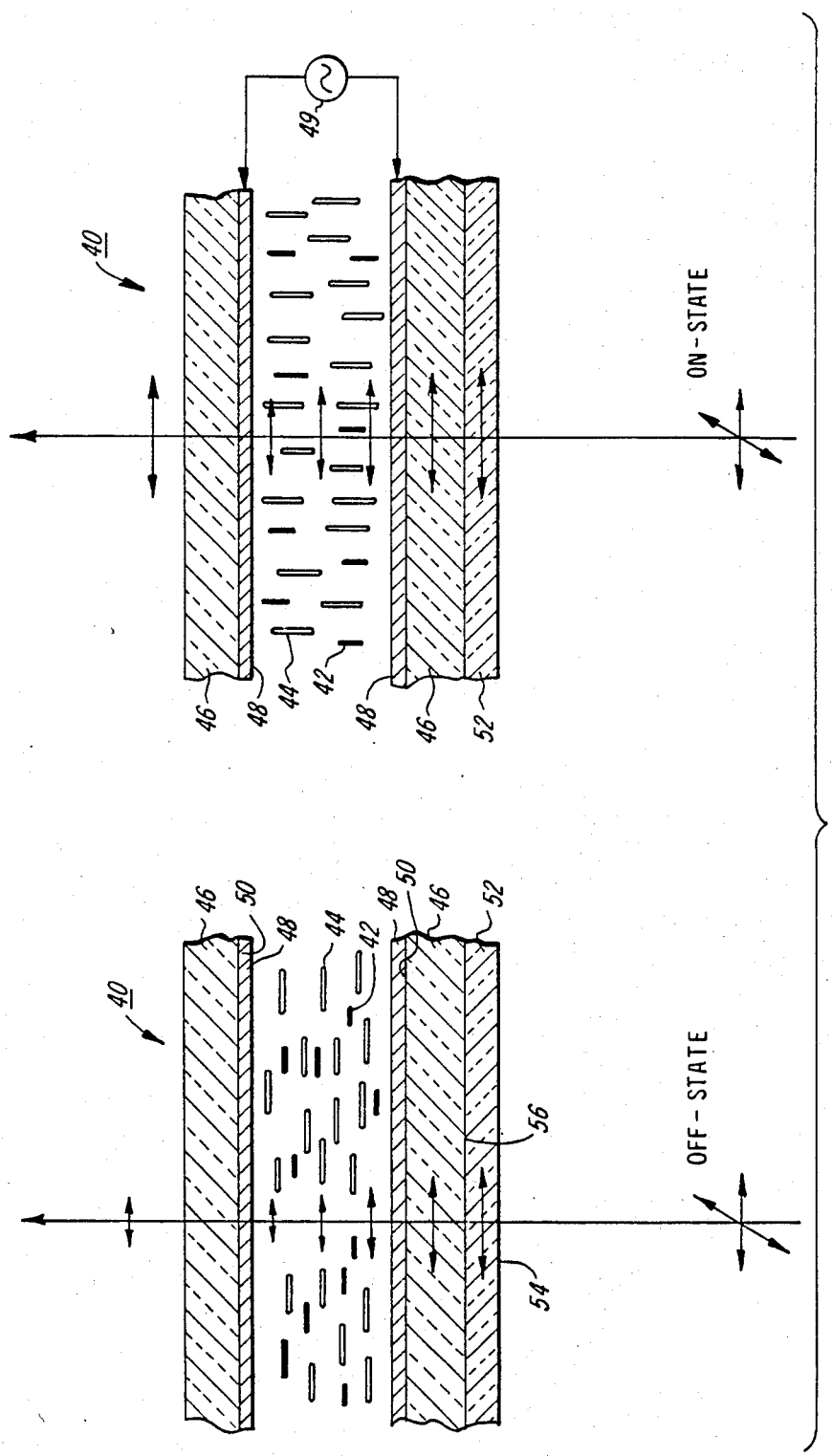
FIG. 3 is a cross-sectional side view of a schematical representation of a typical prior art guest-host effect, transmissive-type liquid crystal display device depicting the off-state and on-state condition.

FIG. 3 is an early, prior art, transmissive-type liquid crystal device 40 having dichroic dye admixed with the nematic liquid crystal material. The dye molecules 42 align themselves with the liquid crystal molecules 44 in a typical guest-host arrangement. The device 40 comprises parallel glass substrates 46 with transparent electrodes 48 placed on the inner, confronting substrate surfaces 50, which substrates sandwich a thin layer of nematic liquid crystal material with a small concentration of dichroic dye. A polarizer 52 was attached to the input surface 56 of the device 40. The polarizing axis of the polarizer is parallel and coincides with the direction of the p-type nematic liquid crystal molecules 44. When an AC voltage is not applied to the transparent electrodes (off-state condition), the dichroic dye molecules absorb much of the polarized light passing therethrough, thus, eliminating the need for a second polarizer/analyzer to block the light when some light bleedthrough is acceptable. The device of FIG. 3 is generally referred to as a "Heilmeier-type" device.

When the electrodes 48 have an AC voltage from source 49 that is above a certain threshold applied across them, the host liquid crystal molecules 44 and guest dye molecules 42 become oriented in a direction parallel to the applied electric field. In this energized condition, the liquid crystal layer with dye molecules therein passes the polarized light therethrough.

Figure 4:
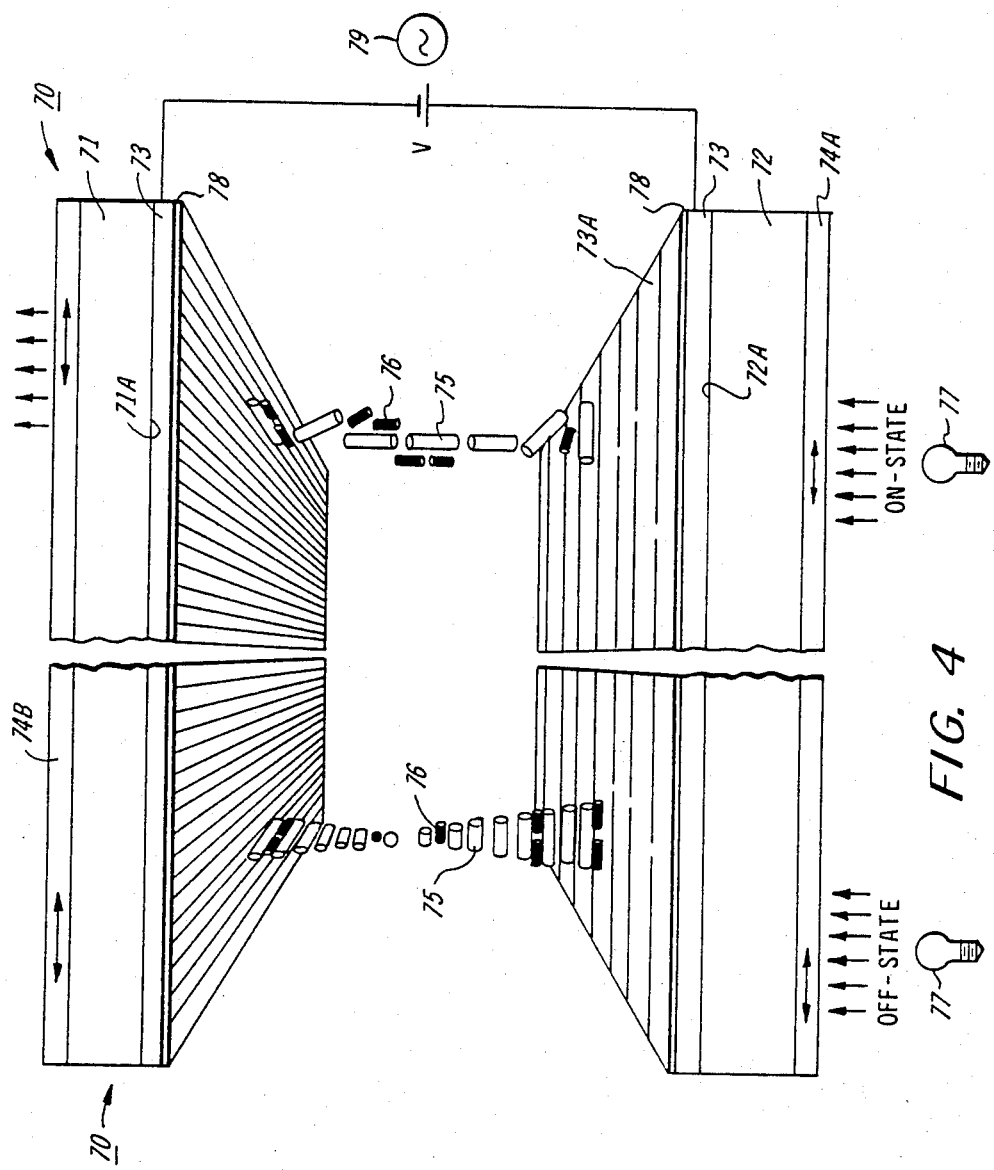
FIG. 4 is a three dimensional, schematic representation of a high-contrast liquid crystal device of the present invention.

The present invention is shown in FIG. 4, wherein a transmission, guest-host type, twisted nematic liquid crystal device 70 is depicted in which a dichroic dye such as anthraquinone or azo dye is admixed with any of the widely used liquid crystal materials. FIG. 4 shows the device 70 in both the off-state and on-state condition. The device 70 comprises parallel, transparent, upper and lower glass substrates 71 and 72, respectively. Transparent electrodes 73 are placed on the inner, confronting surfaces 71a and 72a of the glass substrates. An alignment layer 78 covers the electrodes 73. A thin layer of twisted nematic liquid crystal material, with a relatively small concentration of dichroic dye admixed therein, is sandwiched between the glass substrate surfaces having the electrodes. Polaroid HN32 polarizers 74a, 74b, marketed by and trademark of Polaroid Corporation are attached to each of the glass substrate surfaces opposite the surfaces having the transparent electrodes. The polarizing axes of both polarizers are made parallel and coincident with the direction of the alignment of the liquid crystal molecules 75 at the surface 73a of the transparent electrode 73 on the lower glass substrate surface 72a. Alternately, the polarizers may be rotated in tandem by 90 degrees and substantially the same results achieved. The liquid crystal molecules gradually twist in a manner well known in the art so that the molecules at the upper glass substrate surface have been rotated 90 degrees and are perpendicular to those adjacent the lower glass substrate surface. The axes of the dichroic dye molecules 76 are parallel with axes of the liquid crystal molecules in the typical guest-host arrangement. Light source 77 enters the liquid crystal layer through the polarizer 74a on the lower glass substrate 72. In the off-state condition, the polarized light from light source 77 is blocked when viewed from the output side (viz., viewed from the polarizer 74b side) because of the polarizing direction of polarizer 74b after the polarized light has been twisted 90 degrees by the twisted nematic liquid crystal layer. A second component or the orthogonal mode of the polarized light builds up as the light impinges upon layer after layer of liquid crystal molecules. For a 10 micron liquid crystal cell with a liquid crystal birefringence of about 0.15, approximately 2% of the light would ordinarily exist in this mode because its electric vector is orthogonal to the main component. The light in the orthogonal mode would be almost completely passed by the polarizer 74b, but the dichroic dye, specifically added to prevent the build-up of the orthogonal propagating mode, prevents its passing during the off-state condition.

In the on or energized state, an AC voltage from source 79 is applied to the electrodes 73 of the appropriate magnitude (e.g., 1 to 3 volts) to achieve an electric field across the liquid crystal material in a manner well known in the art. The host liquid crystal molecules align themselves with the direction of the electric field and the guest dichroic dye molecules maintain themselves substantially parallel to the host molecules. Thus, the polarized light is transmitted through the device 70.

It is not necessary that a 90 degree twist cell be used to realize the benefits of the described invention. Other twist angles can be used. The twist of the liquid crystal molecules depend both upon the surface treatment and the amount of chiral dopant, which can be a cholesteric liquid crystal.

A second application of this technology is optical shutters. For example, long linear shutters, the length of xerographic copier drum, can be made. These can be used to turn on and off light from an imaging lens. The LCD can also be used to control light for erasure of the latent image on a photoreceptor in xerographic copiers.

Applications of the present invention are numerous, but offer an especial appeal for liquid crystal displays used in automotive instrument panels and office automation equipment, such as copier instrument panels. One of the reasons is that the prevention of light bleedthrough enables the liquid crystal display to present a better dead front panel. By dead front panel, it is meant the various messages available for activation by the LCD electrodes cannot be detected in the off state. This dead front or very dark off-state, as well as increased contrast, is realizable with this invention and both are very beneficial for improving liquid crystal display devices.

Figure 5:
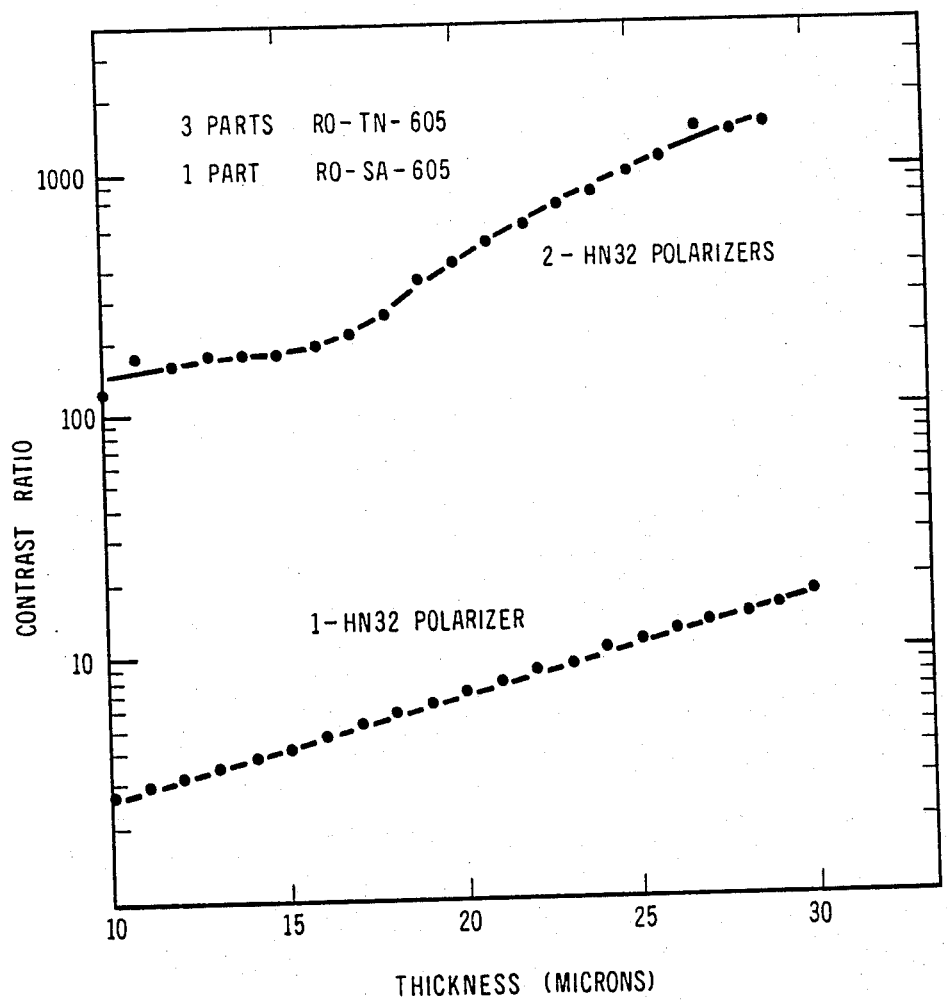
FIG. 5 is a graphical plot of contrast ratio as a function of liquid crystal cell thickness comparing the contrast ratio of a liquid crystal device incorporating a dichroic dye with (a) single polarizer on the input side and (b) the two polarizer arrangement of FIG. 4.

A plot showing contrast enhancement provided by the present invention is shown in FIG. 5. The lower curve was taken with a single high extinction ratio polarizer on the input side of the device of FIG. 4. Thus, contrast was due to absorption differences with and without the dichroic dye rotated by an electric field. The role the liquid crystal material plays in the one polarizer configuration is to orient the molecules. The upper curve was obtained using the two polarizer configuration as shown in FIG. 4.

The contrast in the single polarizer device is given approximately by the expression:

$$\text{contrast ratio(CR)} = e^{3S\alpha_i d}$$

Here S is the order parameter of the dye/liquid crystal mixture, $\alpha_i$ is the isotropic absorption coefficient and d is the liquid crystal layer thickness. No closed form expression for the relationship yet exists for the upper curve which is the subject of the present invention.

The liquid crystal/dye mixture used to obtain this experimental data was obtained from Hoffmann-LaRoche Inc. and the mixture has the product designation RO-SA 605. Contrary to the prior art teaching, valuable gains in contrast is achieved without a large amount of dichroic dye. This data was taken with a diluted dye/liquid crystal mixture. The liquid crystal RO-TN 605, also a product from Hoffmann-LaRoche, was used for dilution purposes.

The data was taken using a tungsten source at 2800 degrees Kelvin color temperature. A Pritchard 1980B photometer was used to measure the photopic contrast ratio. Using Polaroid HN32 polarizers, an off-state density greater than 3 was measured using the device shown in FIG. 4.

Figure 6:
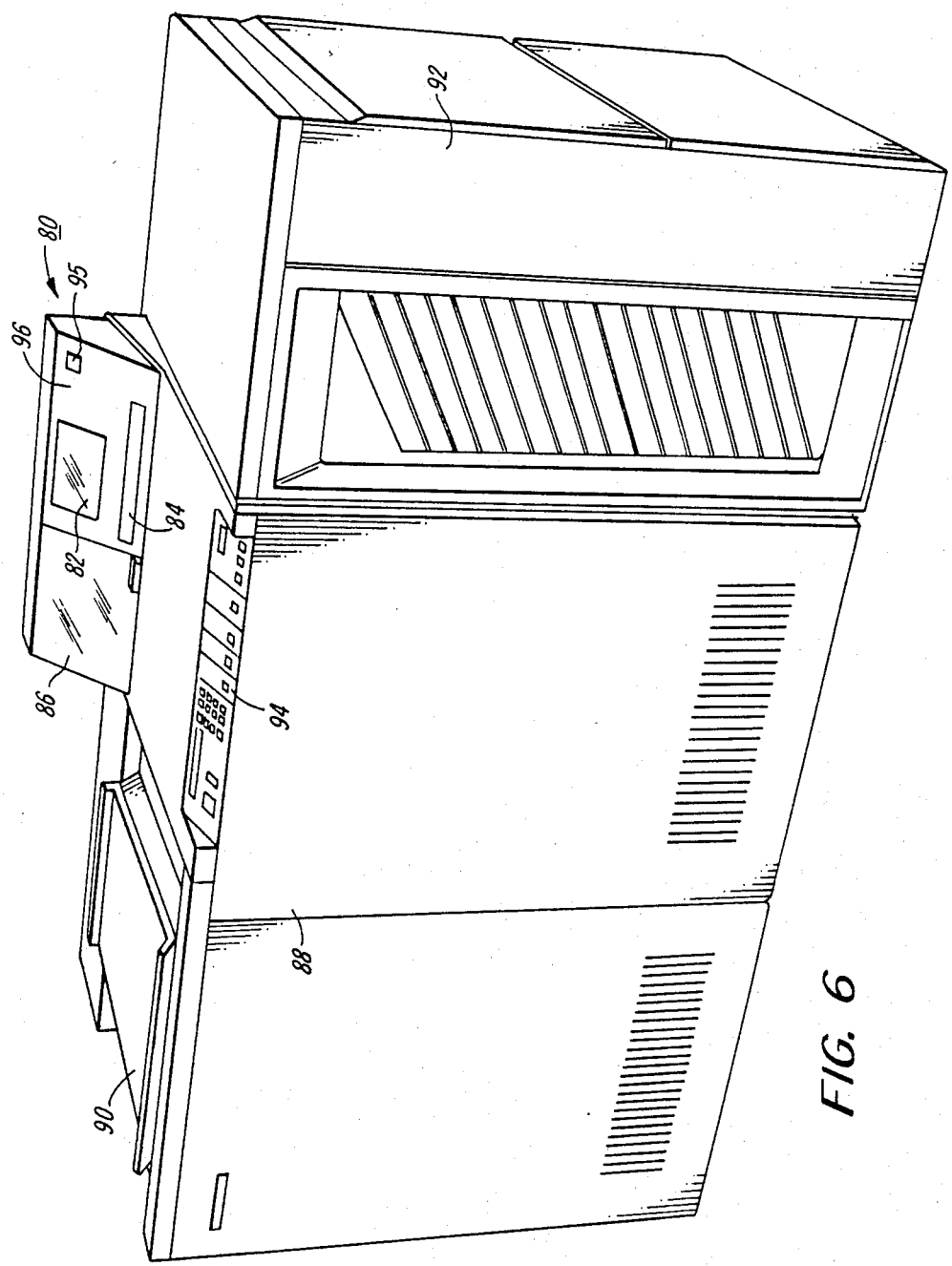
FIG. 6 is a schematic of a xerographic copier with which the present invention has utility.

The present invention relates to a high contrast liquid crystal display which has particular utility as mentioned above for use in automotive instrument panels and office equipment such as xerographic printers and copiers. FIG. 6 shows an example of the use of a liquid crystal display 82 in a copier 80. The liquid crystal display (LCD) cooperates with alphanumeric display 84 to efficiently prompt the user regarding copier status, inform him of certain faults as they occur, and refer the user to flip charts 86 in the event that instructions to be given require more detail than can be conveniently displayed on the LCD 82 and alphanumeric display 84. Refer to U.S. Ser. No. 420,963 to John W. Daughton et al filed Sept. 21, 1982 (now U.S. Pat. No. 4,475,806) and assigned to the same assignee as that of the present invention for operational and electronic interface details between the copier microprocessor and the LCD. Accordingly, the subject matter of the Daughton et al case is hereby incorporated by reference.

The copier 80 includes a housing 88 which provides an attractive appearance and covers typical copier components and subassemblies. The particular copier 80 schematically illustrated includes a platen and platen cover 90. The platen cover 90 is hinged to allow the user to raise and lower the cover 90 and insert original documents onto the platen (not shown) for copying. The copier 80 also includes a sorter 92 which provides collated copy sets of multiple document originals. A control panel 94 allows a user to select copy size, copy contrast, number of copies to be made, and the manner in which the copies are to be made (e.g., duplex or simplex copies). The panel 96 having the liquid crystal display 82 also includes a button 95 for starting the copying operation.

As the user approaches the copier 80 both the LCD 82 and alphanumeric display 84 are blank and can display nothing until the user activates the "Power On" switch 95 to energize the power supply inside the copier 80. Once the power has been turned on, a "Standby" message will appear on the alphanumeric display 84 indicating the copier is not yet ready for use. Once the copier 80 is ready for making xerographic copies, the alphanumeric display 84 shows a "Ready To Make Copies" message telling the user that the copier 80 is ready for operation.

Figure 7:
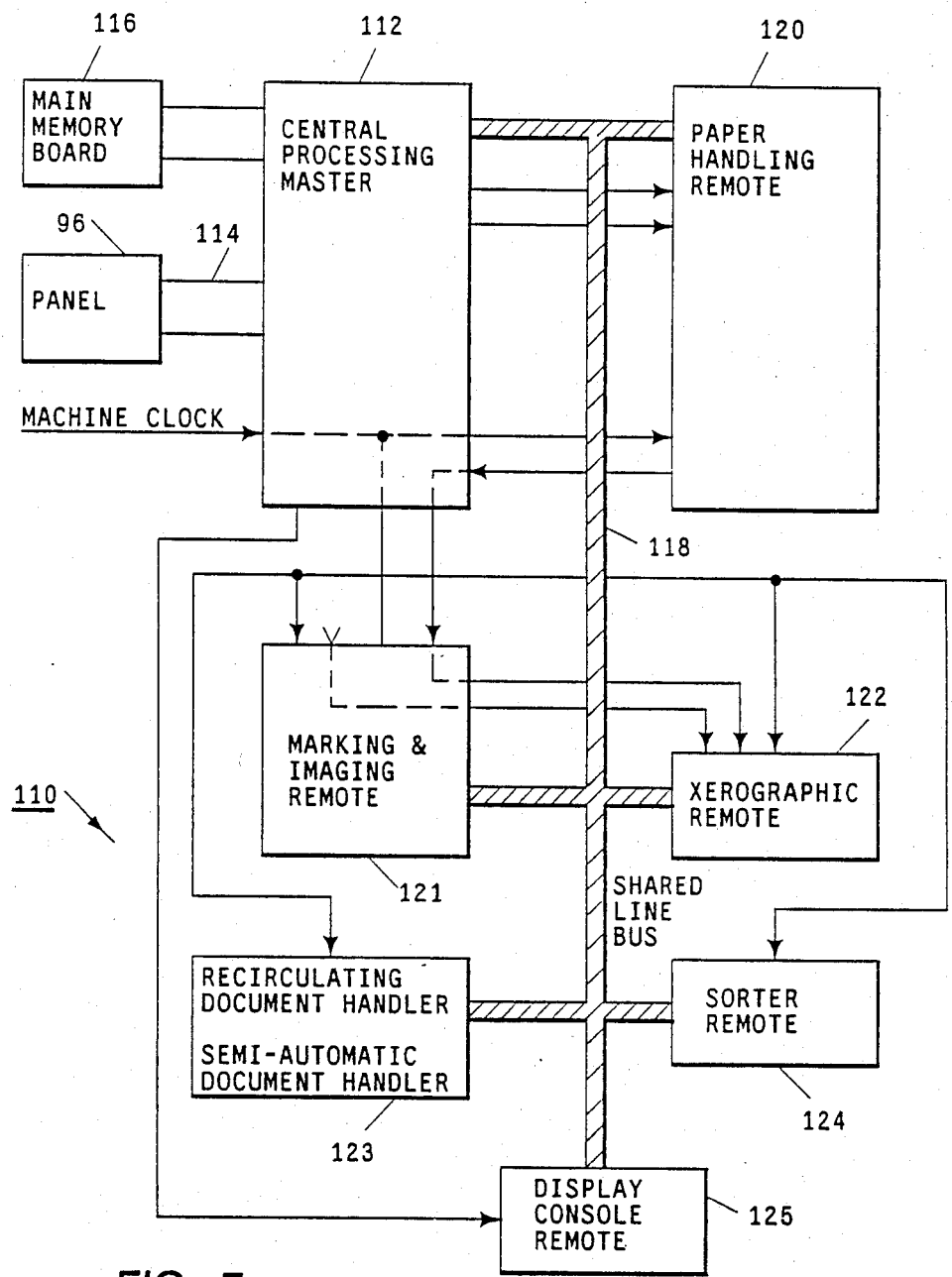
FIG. 7 is a schematic of the electronics used to both control and monitor xerographic functions inside the copier of FIG. 6.

The functioning of the components comprising the copier 80 is controlled and monitored by an electronics subsystem 110 (FIG. 7) comprising a number of programmable controllers which communicate with a master central processor 112. An interface 114 between the panel 96 and main processor 112 applies the processor 112 of inputs entered by the user regarding number of copies, etc. The main processor 112 responds to user inputs by executing its operating system stored in a main memory unit 116.

The algorithm in main memory 116 causes the master central processor 112 to communicate along a communications bus 118 to a number of remote electronics units 120-125 used to monitor and control the copier. The specific units 120-125 vary with copier architecture so the FIG. 7 schematic is representative of one of many possible electric subsystems schematics. Each unit 120-125 has its own microprocessor with accompanying memory (both RAM and ROM) and support circuitry.

The LCD 82 and alphanumeric displays 84 are electrically coupled to a display console remote unit 125. The display console remote unit 125 receives status information, fault information, or program control information from the main processor 112 and then displays an appropriate message on the alphanumeric display 84, and if appropriate, energizes one of a plurality of liquid crystal segments on the LCD display 82.

The liquid crystal display 82 is mounted directly above the alpha-numeric display 84 and located to the side of the flip chart 86. The alphanumeric display 84 comprises a vacuum fluorescent tube capable of generating messages helpful to the copier user.

The liquid crystal display 82 positioned directly above the alpha-numeric display includes various liquid crystal segments to aid the copier user in both interacting with the copier and correcting faults should they occur during operation.

Figure 8:
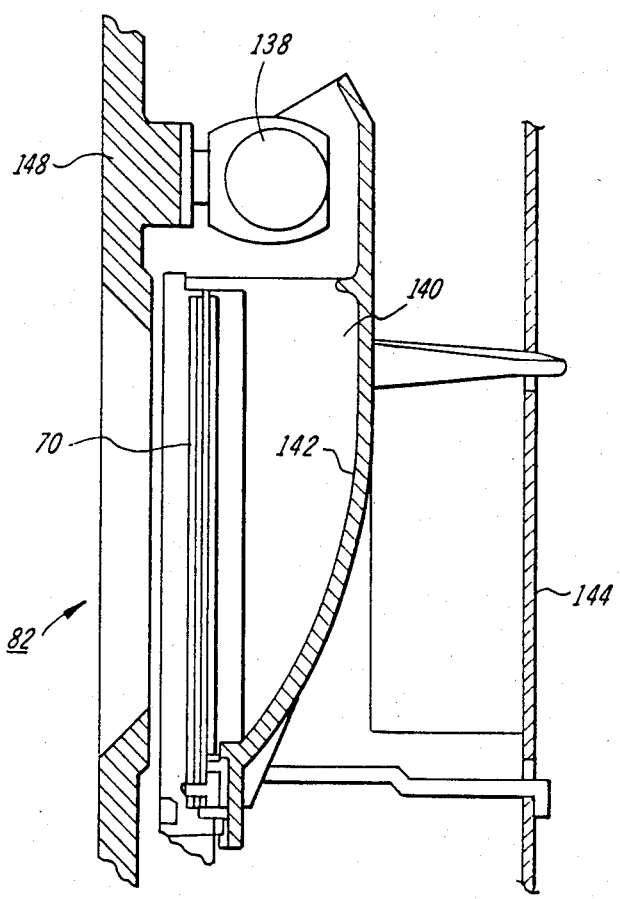
FIG. 8 is a cross-sectional end view of a liquid crystal display which is mounted on the copier of FIG. 6.

The particulars regarding the liquid crystal cell operation within the liquid crystal display has been discussed with reference to FIG. 4. FIG. 8 shows a cross-sectional end view of one configuration of an LCD that may be used in a copier environment such as that of FIG. 6. A fluorescent tube 138 directs light through a chamber 140 behind the display which is bounded by a reflective surface 142 such as, for example, a surface made of ABS white plastic. When the liquid crystal electrode elements are in an unergized state, no light reflecting off the surface 142 reaches the user. When the electrode elements in the liquid crystal display 82, however, are energized, they allow white light to reflect off the surface 142 and pass through the energized segment of the liquid crystal to the user. Thus, when an appropriate ones of the liquid crystal electrodes are energized by a signal from the display console remote unit 125, it is rendered visible due to light passage through that segment.

As appreciated to one skilled in the art, the liquid crystal material will be damaged if the energization signal from the display console remote 125 is of a direct current nature. For this reason, the liquid crystal display portions which are to be rendered visible have electrodes which are energized with a 42 HZ signal, for example, rather than a continuous signal. The fluorescent tube 138, reflecting surface 142, and liquid crystal display 82 are each mounted to a printed circuit board 144 comprising a portion of the display console remote unit 125. A front mounting bracket 148 is positioned over the display 82 to hold the display 82 in place. The bracket 148 includes slotted holes on a bias through which threaded connectors (not shown) are inserted to mate into the panel 96 body. When the bracket 148 is tightened it firmly holds the LCD 82 in place so the electrical connection used to energize the liquid crystal electrodes is secure.

Recapitulating, the present invention provides the method and apparatus for increasing the contrast of a transmissive, twisted nematic liquid crystal display by reducing the orthogonal component of polarized light. The present invention discloses a technique utilizing input and output high extinction ratio polarizers and a dichroic dye guest admixed with the liquid crystal host material, thus, avoiding the use of thick cells which have increased turn-off times and reduced light transmission. The present invention enables contrasts around 150:1 with only a 10 micron cell.

The specific use of the present invention in a copier environment discussed above was only for purposes of illustrating a particular use and was not intended as a primary use. To the contrary, the present invention is important for many different environments.

Many modifications and variations are apparent from the foregoing description of the invention and all such modifications and variations are intended to be within the scope of the present invention.

I claim:

1. A transmissive, twisted nematic liquid crystal display device comprising:

a liquid crystal cell including two transparent, insulating substrates arranged in parallel and each with a confronting surface bearing at least one transparent electrode, a layer of twisted nematic liquid crystal material having liquid crystal molecules parallel to the substrates, said layer being contained between the insulating substrates with said liquid crystal molecules being gradually twisted between the substrates, the cell being capable of transmitting light therethrough in the vicinity of the electrodes upon the application of an electric field across the layer when a potential difference of appropriate magnitude is applied between the electrodes;

a light source for directing light towards one of the insulating surfaces;

means for applying a potential difference between said electrodes and producing an electric field across said cell, when an electric field exists across the cell, said liquid crystal molecules align themselves parallel with the direction of the electric field;

a high extinction ratio polarizer being located on each insulating substrate surface opposite the ones with the electrodes for polarizing the light received from the light source, the polarizers having polarizing axes which are parallel or orthogonal to the direction of the liquid crystal molecules adjacent the insulating surface nearer to the light source, said polarizers having an extinction ratio which enables the attainment of a contrast ratio of greater than 100 from the liquid crystal cell during passage of the main vector component of polarized light; and a relatively small amount of dichroic dye being admixed with the liquid crystal material to form a guest-host mixture therewith, molecules of the dichroic dye being the guest molecules and being of sufficient quantity for absorbing and thus preventing the buildup and subsequent passage of an orthogonal vector component of polarized light created by imperfect rotation of the polarized light by the orientation of the twisted nematic liquid crystal molecules when no electric field is present so that the liquid crystal cell and high extinction ratio polarizers enable a density of 3 or more from said display device when no field is applied across said cell.

2. The liquid crystal display of claim 1, wherein the polarizers are Polaroid HN-32.

3. The liquid crystal display of claim 1, wherein said cell has a plurality of electrodes on each substrate surface and each electrode is capable of being individually addressed by said means for applying a potential difference to create information readable by an observer.

4. The liquid crystal display of claim 3, wherein the plurality of electrodes on each substrate surface comprise a series of closely spaced, electrodes, the electrodes on each of the substrate surfaces being mutually perpendicular so that the application of a potential across selected electrodes permit matrix addressing.

5. The liquid crystal display of claim 1, wherein the liquid crystal/dye mixture is Hoffmann-LaRoche RO-SA-605 and the thickness of the layer of said mixture is 10 microns.

6. A method of providing a transmissive, high contrast liquid crystal display device comprising the steps of:

providing a liquid crystal cell having a pair of parallel, transparent glass substrates with transparent electrodes on confronting surfaces thereof, and a twisted nematic liquid crystal material contained between the substrates;

attaching high extinction ratio polarizers on each of the substrate surfaces opposite the confronting ones, the polarizing axes of both polarizers being parallel or orthogonal with the direction of molecules of the liquid crystal material adjacent the substrate surface of a one of the pair of substrates selected as an input substrate, said polarizers having an extinction ratio which enables the attainment of a contrast ratio of greater than 100 from the liquid crystal cell during passage of the main vector component of polarized light;

admixing a relatively small amount of dichroic dye with the liquid crystal material to form a guest-host mixture of liquid crystal and dye molecules the amount of dichroic dye being sufficient to absorb an orthogonal vector component of polarized light created by the imperfect rotation of the polarized light by the orientation of the twisted nematic liquid crystal molecules when no electric field is produced between the transparent electrodes;

directing light from a light source toward said polarizer on the input substrate, so that the light received by the input substrate is polarized, and so that the liquid crystal display device has a density of 3 or more when there is no electric field produced between the transparent electrodes; and applying an alternating current voltage across the electrodes to produce an electric field therebetween to change the orientation of the molecules of the mixture and enable the passage of light when the passage of light is desired.

* * * * *